(12) United States Patent
Yeung et al.

(10) Patent No.: US 8,428,451 B2
(45) Date of Patent: Apr. 23, 2013

(54) INTERCHANGEABLE ZOOM LENS ACTUATOR

(75) Inventors: Chuen Kuen Yeung, New Territories (HK); Kai Cheong Kwan, Wong Tai Sin (HK); Kwok Sing Cheng, Tuen Mun (HK)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 0 days.

(21) Appl. No.: 13/190,258

(22) Filed: Jul. 25, 2011

(65) Prior Publication Data

US 2013/0028581 A1 Jan. 31, 2013

(51) Int. Cl.
*G03B 17/00* (2006.01)
(52) U.S. Cl.
USPC .......................................................... 396/75

(58) Field of Classification Search .............. 396/73–75; 348/344
See application file for complete search history.

(56) References Cited

U.S. PATENT DOCUMENTS

| 6,560,016 | B2 | 5/2003 | Usui | |
|---|---|---|---|---|
| 6,567,352 | B1 * | 5/2003 | Inui et al. | ................... 369/44.21 |
| 7,280,287 | B2 | 10/2007 | Yamane | |
| 7,295,390 | B2 | 11/2007 | Miki | |
| 7,747,155 | B1 * | 6/2010 | Gutierrez | ......................... 396/73 |
| 2003/0076421 | A1 * | 4/2003 | Dutta | ...................... 348/208.11 |
| 2009/0295986 | A1 * | 12/2009 | Topliss et al. | ................. 348/374 |

\* cited by examiner

*Primary Examiner* — Clayton E Laballe
*Assistant Examiner* — Noam Reisner
(74) *Attorney, Agent, or Firm* — Berkeley Law & Technology Group, LLP

(57) ABSTRACT

The subject matter disclosed herein relates to an optical module that includes interchangeable lenses to adjust a zoom level of the optical module.

27 Claims, 9 Drawing Sheets

INTERCHANGEABLE ZOOM LENS ACTUATOR

FIELD

The subject matter disclosed herein relates to an optical module that includes interchangeable lenses to adjust a zoom level of the optical module.

BACKGROUND

Many portable electronic apparatuses, such as a cellular phone and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can be manufactured with reduced cost by reducing manufacturing tolerances of an optical system of the camera modules.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

As used to describe such embodiments, terms "above", "below", "upper", "lower", "horizontal", "vertical", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on. "Horizontal" may refer to an orientation perpendicular to an optical axis while "vertical" may refer to an orientation parallel to the optical axis.

Figure 1A:
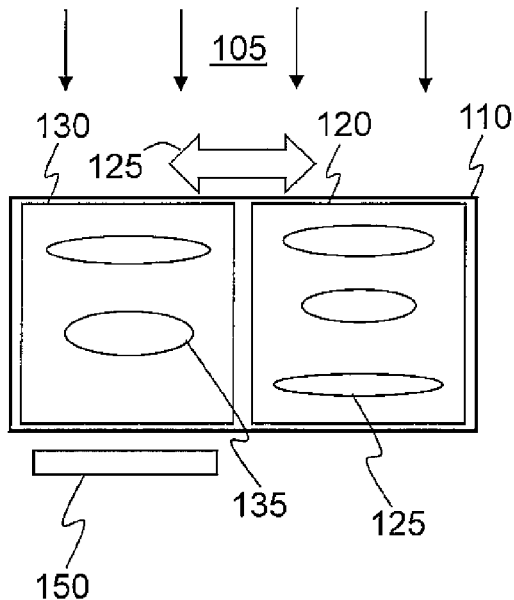
FIGS. 1A, 1B, and 1C include schematic cross-section views of lens assemblies and an image sensor, according to an embodiment.
Figure 1B:
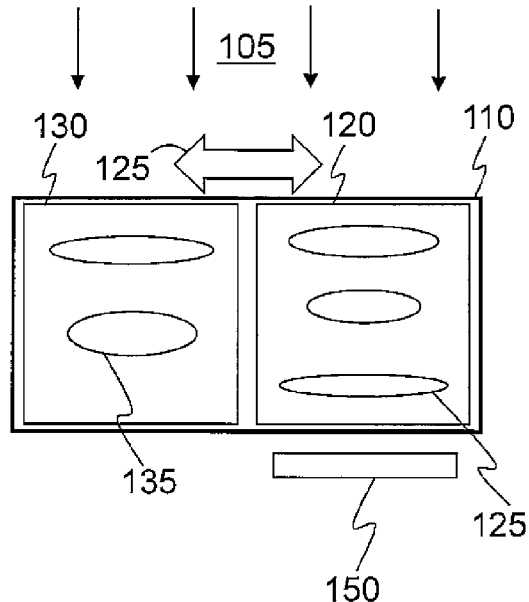
Figure 1C:
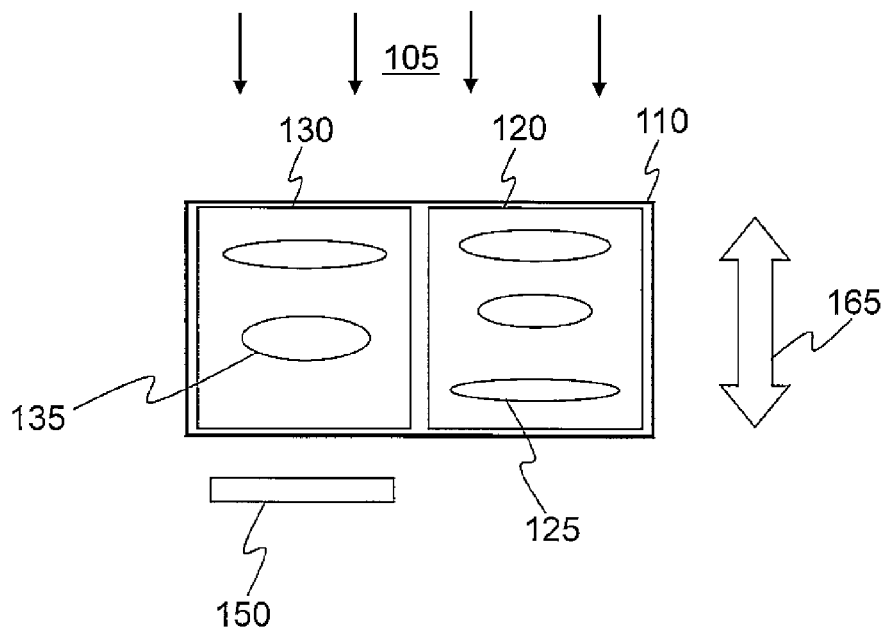

Embodiments described herein include a compact imaging module that provides a mechanism and/or allows a process to adjust a zoom level by selecting one of two or more individual lens assemblies having different effective focal lengths. FIGS. 1A, 1B, and 1C include schematic cross-section views of lens assemblies and an image sensor, according to a particular embodiment. A first lens assembly 130 may comprise two or more optical elements 135, which may comprise a plurality of lenses, for example. A second lens assembly 120 may comprise two or more optical elements 125, which may comprise a plurality of lenses, for example. First lens assembly 130 may provide a different zoom level to the compact imaging device than that of second lens assembly 120. A selected lens assembly (e.g., lens assembly 120 or 130) may receive light 105 and provide an image to image sensor 150.

In FIG. 1A, a selected lens assembly may comprise first lens assembly 130 placed near an image sensor 150 to provide an image onto an active region (not shown) of the image sensor while unselected second lens assembly 120 may be set aside and placed away from the image sensor. In FIG. 1B, a selected lens assembly may comprise second lens assembly 120 placed near image sensor 150 to provide an image onto the image sensor while unselected first lens assembly 130 may be set aside and placed away from the image sensor. Selection of a particular lens assembly may be made by moving a platform or frame 110 in a direction indicated by arrow 125, for example.

A compact imaging module may also allow focus adjustments by selectively changing a distance between individual lens assemblies and an image sensor. For example, in FIG. 1C, selected first lens assembly 130 and unselected second lens assembly 120 may be moved in a direction indicated by arrow 165. A distance between a lens assembly and an image sensor, for example, may be adjustable, at least in part, in response to an electromagnetic force generated by one or more magnets and a coil. A distance may be measured along an optical axis of the lens assembly. In an implementation, an electromagnetic force may be generated by exactly one magnet that is shared among two or more coils, as described below. In a particular embodiment, for example, a structure of a compact imaging module, such as a compact camera module, may provide zoom capability, auto-focus, and/or other imaging functions by adjusting a distance between individual lens assemblies and an image sensor. A compact imaging module may provide an advantage to designers incorporating such a module into increasingly slimmer, smaller, and/or lighter portable electronic apparatuses, such as a compact camera or cell phone, for example. Of course, such details of a compact imaging module are merely examples, and claimed subject matter is not so limited.

In one embodiment, a compact imaging module may comprise a first lens assembly having a first effective focal length and a second lens assembly having a second effective focal length. The term "effective focal length" refers to a focal length of an assembly of individual lenses, as opposed to a focal length of an individual lens. A magnification or zoom level of a lens assembly may be based, at least in part, on the effective focal length of the lens assembly. Accordingly, a first lens assembly having a first effective focal length may produce an image having one zoom level and a second lens assembly having a second effective focal length may produce an image having another zoom level. A compact imaging module may comprise a moveable platform on which first and second lens assemblies may be mounted. An image sensor may receive light from the first lens assembly if the moveable platform is in a first position or the image sensor may receive light from the second lens assembly if the moveable platform is in a second position. In particular, a moveable platform may selectively place a first lens assembly or a second lens assembly in a position so that light transmitting through the selected lens assembly may be received by an image sensor. Meanwhile, an unselected lens assembly may be placed in a position so that any light transmitted through the unselected lens assembly may not be received by the image sensor.

A compact imaging module may comprise a first actuator to change a distance between an image sensor and a moveable platform that supports two or more lens assemblies, as described above. Changing such a distance may adjust a focus of the lens assemblies with respect to the image sensor. In other words, a distance between a lens assembly and an image sensor may be adjusted so that a focused image produced by the lens assembly is received by the image sensor. A first actuator may comprise at least one magnet and at least one coil to produce an electromagnetic force on the moveable platform in a direction parallel to an optical axis of any of the lens assemblies in the compact imaging module. In one implementation, a first actuator may comprise exactly one magnet that is shared among a number of coils, as explained below. A magnet may comprise a permanent magnet made from a material that is magnetized to create its own persistent magnetic field. Such a material may comprise, for example, a ferromagnetic material such as iron, nickel, cobalt, or some alloys of rare earth metals, just to name a few examples. A coil may comprise a wound coil, a printed coil, or an electroplated coil on a substrate, for example. A compact imaging module may comprise a spring to provide a restoring force to a moveable platform that supports two or more lens assemblies lens assembly. Of course, such details of a compact imaging module are merely examples, and claimed subject matter is not so limited.

The compact imaging module may further comprise a second actuator to move a moveable platform to a first position or a second position so that a first lens assembly having a first effective focal length or a second lens assembly having a second effective focal length may be placed in front of an image sensor. Accordingly, by operating an actuator to change a position of a moveable platform, a zoom level of a compact imaging module may be selected among two values (or three or more values in a case where a compact imaging module comprises three or more individual lens assemblies). In one implementation, such an actuator may comprise at least one magnet and at least one coil to produce an electromagnetic force on a moveable platform in a direction perpendicular to an optical axis of any of the lens assemblies in the compact imaging module. In another implementation, such an actuator to move a moveable platform may comprise exactly one magnet that is shared among a number of coils, as explained below. In yet another implementation, an actuator to move a moveable platform may comprise a discrete-position type actuator. A discrete-position type actuator, for example, may change a position of a moveable platform to one of two particular positions. A moveable platform in a first position to place a first lens assembly in front of an image sensor may enable a compact imaging module to have a first zoom level. The moveable platform in a second position to place a second lens assembly in front of the image sensor may enable a compact imaging module to have a second zoom level. In other implementations, a compact imaging module may comprise three or more lens assemblies and a corresponding discrete-position type actuator may be able to change a position of a moveable platform to one of three or more positions, for example.

In other implementations, an actuator that provides motion to a moveable platform in a direction along an optical axis may provide a relatively precise control of motion of one or more lens assemblies located on the moveable platform. For example, such an actuator may provide a continuous, linear motion so that distance between a selected lens assembly and an image sensor may be adjusted by any amount. Such adjustments may be made, for example, to focus an image of a lens assembly onto an image sensor. For example, an actuator may produce varying magnitudes of electromagnetic forces based, at least in part, on a varying magnitude of electrical current travelling in a coil of the actuator. Such varying magnitudes may provide varying distances between a lens assembly and an image sensor to precisely control a focus of light onto the image sensor. For example, a distance between a lens assembly and an image sensor may be based, at least in part, on a magnetic field, wherein such a distance is measured along an optical axis of a lens assembly. Of course, such details of actuator 600 are merely examples, and claimed subject matter is not so limited.

In an embodiment, a compact imaging module may include a light shield to cover at least a portion of a first lens assembly or a second lens assembly. Such a light shield may be used to prevent light leakage from reaching an image sensor via an unselected lens assembly. For example, if a first lens assembly is selected to be placed in front of an image sensor, then a light shield may be used to cover at least a portion of the unselected second lens assembly so that light leakage may be prevented from reaching the image sensor via the second lens assembly. In one implementation, a light shield may comprise one light shield per lens assembly. A light shield may comprise an appendage or portion of a frame of a compact imaging module so that the light shield is stationary with respect to an image sensor of the compact imaging module. In another implementation, a light shield may comprise rotational freedom of motion about an axis that is moveable (e.g., with respect to an image sensor of a compact imaging module) with a moveable platform on which two or more individual lens assemblies are placed. Such a light shield may be rotatable in response to striking an appendage or portion of a frame of a compact imaging module. In such a case, a light shield may be rotated into a position to prevent light leakage from reaching an image sensor via an unselected lens assembly, or the light shield may be rotated into a position to allow light to enter a selected lens assembly, as described below. In yet another implementation, a light shield may comprise a spring to maintain a position of the light shield to cover at least a portion of an unselected first or second lens assembly.

In one embodiment, a compact imaging module may comprise a horizontal motion (HM) platform comprising a magnet, and a vertical motion (VM) platform comprising a focusing coil to magnetically interact with the magnet. A first lens assembly having a first effective focal length and a second lens assembly having a second effective focal length may be mounted to and physically supported by the VM platform. One or more zoom coils attached to a portion of a frame of the compact imaging module may magnetically interact with the magnet of the HM platform, as described below. An image sensor may receive light from a first lens assembly if a HM platform is in a first position or the image sensor may receive light from a second lens assembly if the HM platform is in a second position. One or more zoom coils may be used to select the first position or the second position, for example. In other words, one or more zoom coils may magnetically interact with a magnet included in a HM platform to place the HM platform in a first position or a second position. The one or more zoom coils may be stationary with respect to an image sensor of the compact imaging module. On the other hand, a focusing coil attached to a VM platform may move relative to an image sensor and therefore be stationary with respect to first and second lens assemblies, as described below. In addition, a magnet attached to a HM platform may be moveable with respect to first and second lens assemblies and an image sensor. In one implementation, the magnet may be selectively magnetically coupled to a focusing coil and/or one or more zoom coils to change a position of a VM platform in a direction parallel or perpendicular to an optical axis of first or second lens assemblies. Of course, such details of a compact imaging module are merely examples, and claimed subject matter is not so limited.

Figure 2:
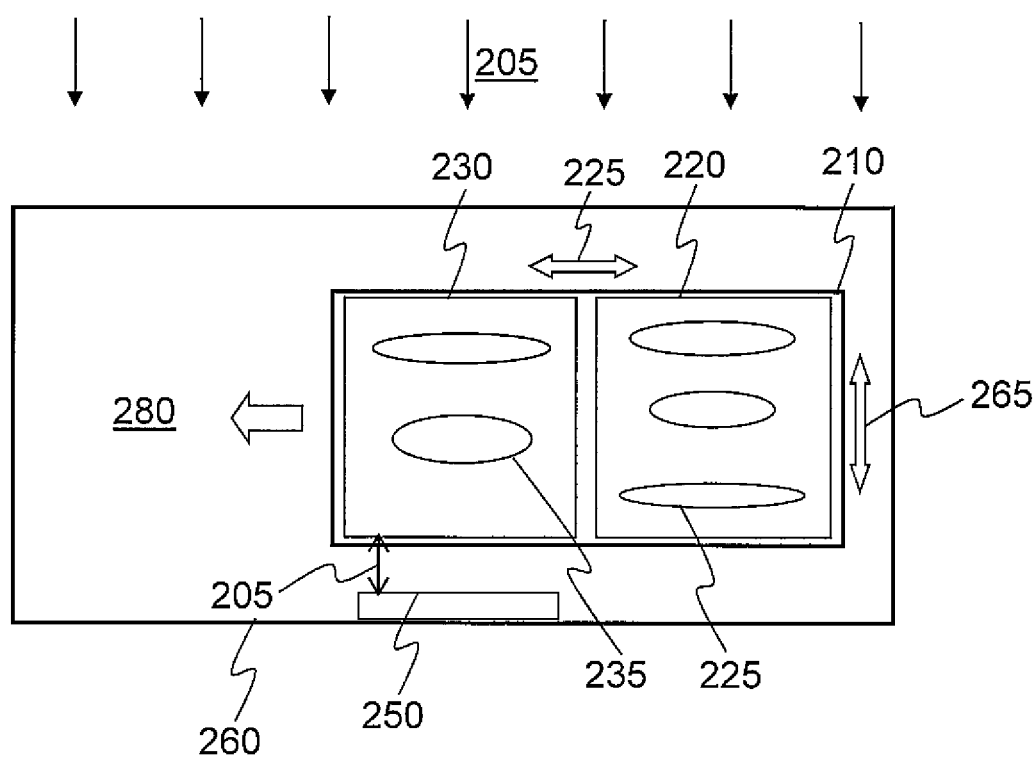
FIG. 2 includes a schematic cross-section view of lens assemblies and an image sensor, according to another embodiment.

FIG. 2 includes a schematic cross-section view of lens assemblies and an image sensor, according to another embodiment. A first lens assembly 230 may comprise two or more optical elements 235, which may comprise a plurality of lenses, for example. A second lens assembly 220 may comprise two or more optical elements 225, which may comprise a plurality of lenses, for example. First lens assembly 230 may provide a different zoom level to the compact imaging device than that of second lens assembly 220. A selected lens assembly (e.g., lens assembly 220 or 230) may receive light 205 and provide an image to image sensor 250. The image sensor may include an active region (not shown) comprising an array of pixilated charge-coupled devices (CCD) and/or one or more complementary metal-oxide-semiconductor (CMOS) devices, just to name a few examples. Image sensor 250 may also comprise an inactive region (not shown) at least partially surrounding an active region. Such an inactive region may comprise a border or frame for an active region that may be used to physically support other portions of a compact imaging module without interfering with light impinging on the active region.

In the case shown in FIG. 2, a selected lens assembly may comprise first lens assembly 230 placed near an image sensor 250 to project an image onto an active region (not shown) of the image sensor while unselected second lens assembly 220 may be set aside and placed away from the image sensor. Selection of first lens assembly 230 or second lens assembly 220 may be made by moving a platform or frame 210 in a direction indicated by arrow 225, for example. A compact imaging module may also allow focus adjustments by selectively changing a distance 205 between individual lens assemblies and an image sensor. For example, selected first lens assembly 230 and unselected second lens assembly 220 may be moved in a direction indicated by arrow 265. A distance between a lens assembly and an image sensor, for example, may be adjustable, at least in part, in response to an electromagnetic force generated by one or more magnets and a coil, as described below.

Figure 3:
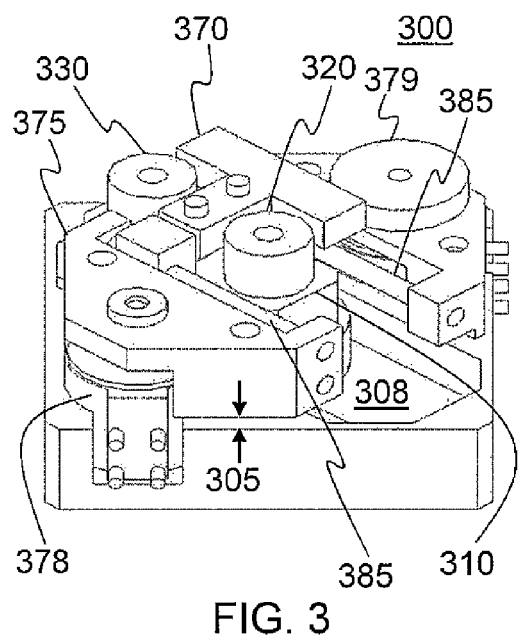
FIGS. 3, 4, and 5 are perspective views of a compact imaging module, according to an embodiment.
Figure 4:
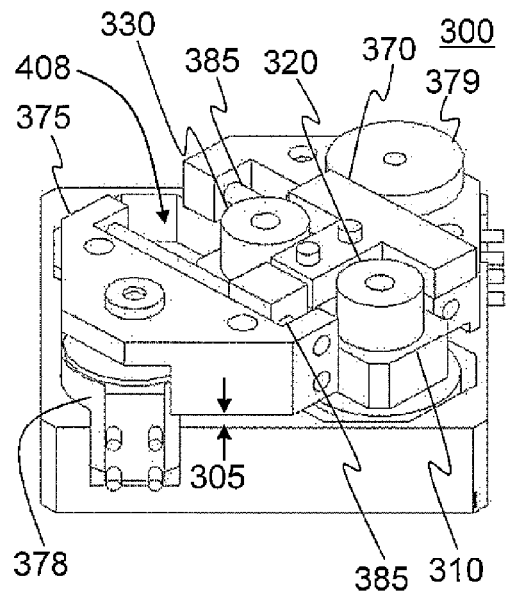
Figure 5:
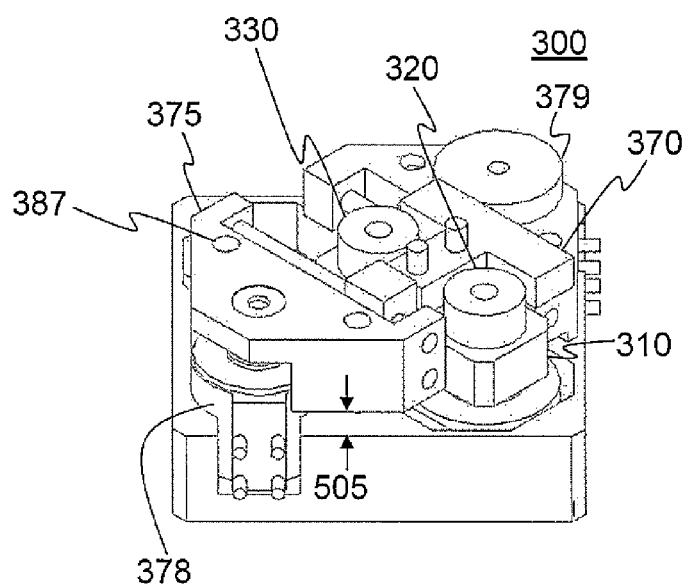

FIGS. 3, 4, and 5 are perspective views of a compact imaging module 300, according to an embodiment. Such a compact imaging module may comprise a first lens assembly 330 having a first effective focal length and a second lens assembly 320 having a second effective focal length. A compact imaging module may comprise a moveable platform 310 on which first and second lens assemblies may be mounted. In FIG. 3, an image sensor (not shown in FIGS. 3, 4, and 5) may receive an image from second lens assembly 320 if the moveable platform is in a position that places second lens assembly 320 over the image sensor. On the other hand, in FIG. 4, the image sensor may receive an image from first lens assembly 330 if the moveable platform is in a position that places first lens assembly 330 over the image sensor. In this case, unselected lens assembly 320 may be placed in a position so as to occupy a space 308 so that any light transmitted through unselected lens assembly 320 will not be received by the image sensor.

Compact imaging module 300 may comprise a first actuator 378 to change a distance between an image sensor and moveable platform 310 that supports two or more lens assemblies (e.g., 320 and 330), as described above. Changing such a distance may adjust a focus of the lens assemblies with respect to the image sensor. Driving element 375 may comprise a driving force transmission gear or element responsive to first actuator 378. First actuator 378 may comprise at least one magnet and at least one coil to produce an electromagnetic force on moveable platform 310 in a direction parallel to an optical axis of any of the lens assemblies in the compact imaging module. In one implementation, a first actuator may comprise exactly one magnet that is shared among a number of coils, as explained below. In another implementation, a first actuator may comprise a motor or a stepper motor, though claimed subject matter is not limited in this respect.

Compact imaging module 300 may further comprise a second actuator 379 to move moveable platform 310 to a first position or a second position so that first lens assembly 330 having a first effective focal length or second lens assembly 320 having a second effective focal length may be placed in front of an image sensor. Accordingly, by operating actuator 379 to change a position of moveable platform 310, a zoom level of the compact imaging module may be selected among two values (or three or more values in the case where a compact imaging module comprises three or more individual lens assemblies). Driving element 370 may comprise a driving force transmission gear or element responsive to second actuator 379. In one implementation, actuator 379 may comprise at least one magnet and at least one coil to produce an electromagnetic force on moveable platform 310 in a direction perpendicular to an optical axis of any of the lens assemblies in the compact imaging module. In another implementation, actuator 379 may comprise exactly one magnet that is shared among a number of coils, as explained below. In yet another implementation, a second actuator may comprise a motor or a stepper motor, though claimed subject matter is not limited in this respect. In still another implementation, actuator 379 may comprise a discrete-position type actuator. Whether or not actuator 379 comprises a discrete-position type actuator, actuator 378 need not comprise a discrete-position type actuator. Accordingly, actuator 378 may provide a relatively precise control of motion of one or more lens assemblies located on moveable platform 310. For example, actuator 378 may provide a continuous, linear motion so that distance between a selected lens assembly and an image sensor may be adjusted by any amount. Such adjustments may be made, for example, to focus an image of a lens assembly onto an image sensor.

Compact imaging module 300 may further comprise one or more rails or shafts 385 on which platform 310 moves. Shafts 385 may be oriented in a direction perpendicular to an optical axis (e.g., horizontal motion) of lens assembly 320 or 330. Accordingly, platform 310 may move linearly in a direction perpendicular to an optical axis on shafts 385 to place lens assembly 320 or lens assembly 330 over an active region of an image sensor. Horizontal motion of platform 310 may be performed to adjust a zoom level of compact imaging module 300, for example. For motion parallel to an optical axis (e.g., vertical motion), shafts 387 may be used to guide platform 310 while changing a distance between lens assembly 320, 330 and an image sensor. Vertical motion of platform 310 may be performed to adjust focus of compact imaging module 300, for example. Of course, such details of compact imaging module 300 are merely examples, and claimed subject matter is not so limited.

Figure 6:
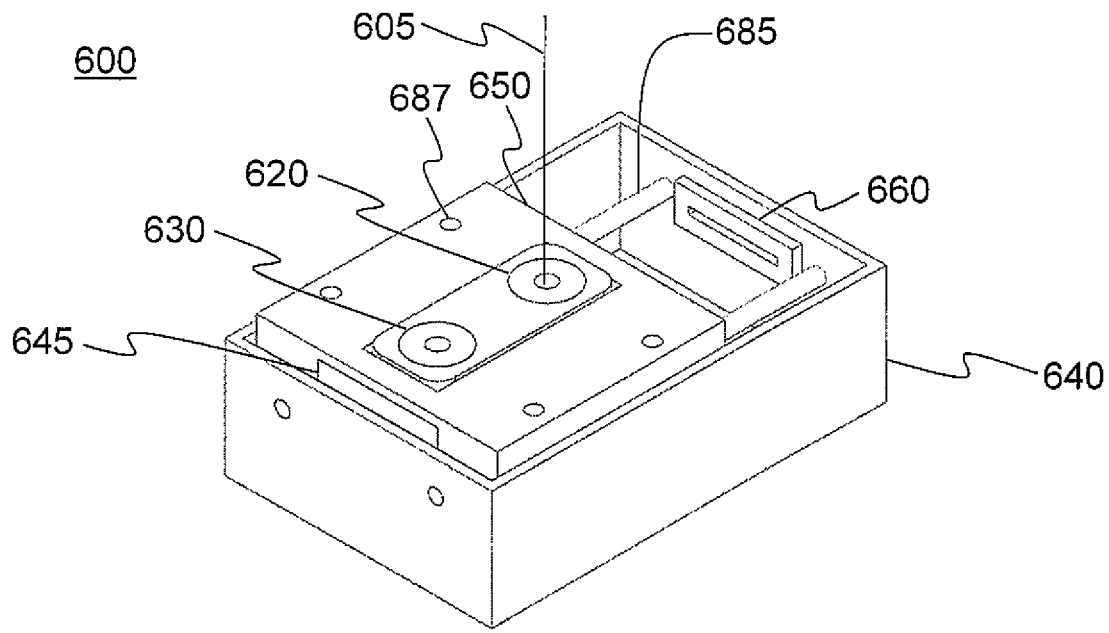
FIG. 6 is a perspective view of a compact imaging module, according to an embodiment.

FIG. 6 is a perspective view of a compact imaging module 600, according to an embodiment. Module 600 may comprise a first lens assembly 630 having a first effective focal length and a second lens assembly 620 having a second effective focal length. Compact imaging module 600 may comprise a moveable platform 650 on which first and second lens assemblies may be mounted. An actuator may comprise a magnet (not shown in FIG. 6) and a coil 645 attached to platform 650. One or more coils 660 may also interact with the magnet to move platform 650 to a first position or a second position so that first lens assembly 630 having a first effective focal length or second lens assembly 620 having a second effective focal length may be placed in front of an image sensor. Accordingly, by operating an actuator to change a position of platform 650, a zoom level of compact imaging module 600 may be selected among two values (or three or more values in the case where a compact imaging module comprises three or more individual lens assemblies). One or more coils 660 may be mounted to a frame 640 of compact imaging module 600 so as to be stationary with respect to an image module. Platform 650 may move horizontally in a linear direction perpendicular to an optical axis 605 along shafts 685. In addition, platform 650 may move vertically in a linear direction parallel to optical axis 605 on shafts 687 to change a distance between an image sensor and first and second lens assemblies mounted to platform 650. Changing such a distance may adjust a focus of the lens assemblies with respect to the image sensor, as discussed above. Of course, such details of compact imaging module 600 are merely examples, and claimed subject matter is not so limited.

Figure 7:
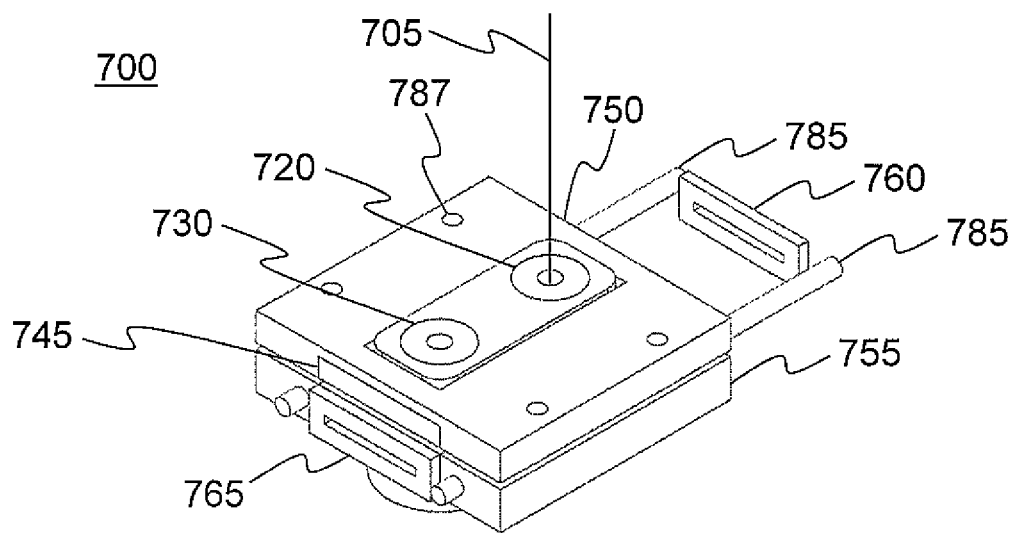
FIG. 7 is a perspective view of a compact imaging module, according to another embodiment.

FIG. 7 is a perspective view of a compact imaging module 700, according to an embodiment. Compact imaging module 700 may be similar to compact imaging module 600 except that a frame 640 may be removed in FIG. 7 to show additional elements of module 700. Compact imaging module 700 may comprise a horizontal motion (HM) platform 755 comprising a magnet (not shown in FIG. 7), and a vertical motion (VM) platform 750 comprising a focusing coil 745 to magnetically interact with the magnet. A first lens assembly 730 having a first effective focal length and a second lens assembly 720 having a second effective focal length may be mounted to and physically supported by VM platform 750. One or more zoom coils 760 and 765 attached to a portion of a frame (e.g., such as frame 640) of compact imaging module 700 may magnetically interact with the magnet of the HM platform, as described below. An image sensor (not shown in FIG. 7) may receive light from first lens assembly 730 if HM platform 755 is in a first position or the image sensor may receive light from second lens assembly 720 if HM platform 755 is in a second position. One or more zoom coils 760 and 765 may be used to select the first position or the second position, for example. In other words, one or more zoom coils 760 and 765 may magnetically interact with a magnet included in HM platform 755 to place the HM platform in a first position or a second position. The one or more zoom coils may be stationary with respect to an image sensor of the compact imaging module. On the other hand, a focusing coil 745 attached to VM platform 750 may move relative to an image sensor and therefore be stationary with respect to first and second lens assemblies 720 and 730, as described below. In addition, a magnet attached to HM platform 755 may be moveable with respect to first and second lens assemblies 720 and 730 and an image sensor. In one implementation, the magnet may be selectively magnetically coupled to focusing coil 745 and/or one or more zoom coils 760 and 765 to change a position of VM platform 750 in a direction parallel or perpendicular to an optical axis 705.

Compact imaging module 700 may further comprise one or more rails or shafts 785 on which platform 755 moves. Shafts 785 may be oriented in a direction perpendicular to optical axis 705 (e.g., horizontal motion). Accordingly, platform 755 may move linearly in a direction perpendicular to optical axis 705 on shafts 785 to place lens assembly 720 or lens assembly 730 over an active region of an image sensor. Horizontal motion of platform 755 may be performed to adjust a zoom level of compact imaging module 700, for example. For motion parallel to an optical axis (e.g., vertical motion), shafts 787 may be used to guide VM platform 750 while changing a distance between lens assembly 720, 730 and an image sensor. Vertical motion of platform 750 may be performed to adjust focus of compact imaging module 700, for example. Of course, such details of compact imaging module 700 are merely examples, and claimed subject matter is not so limited.

Figure 8A:
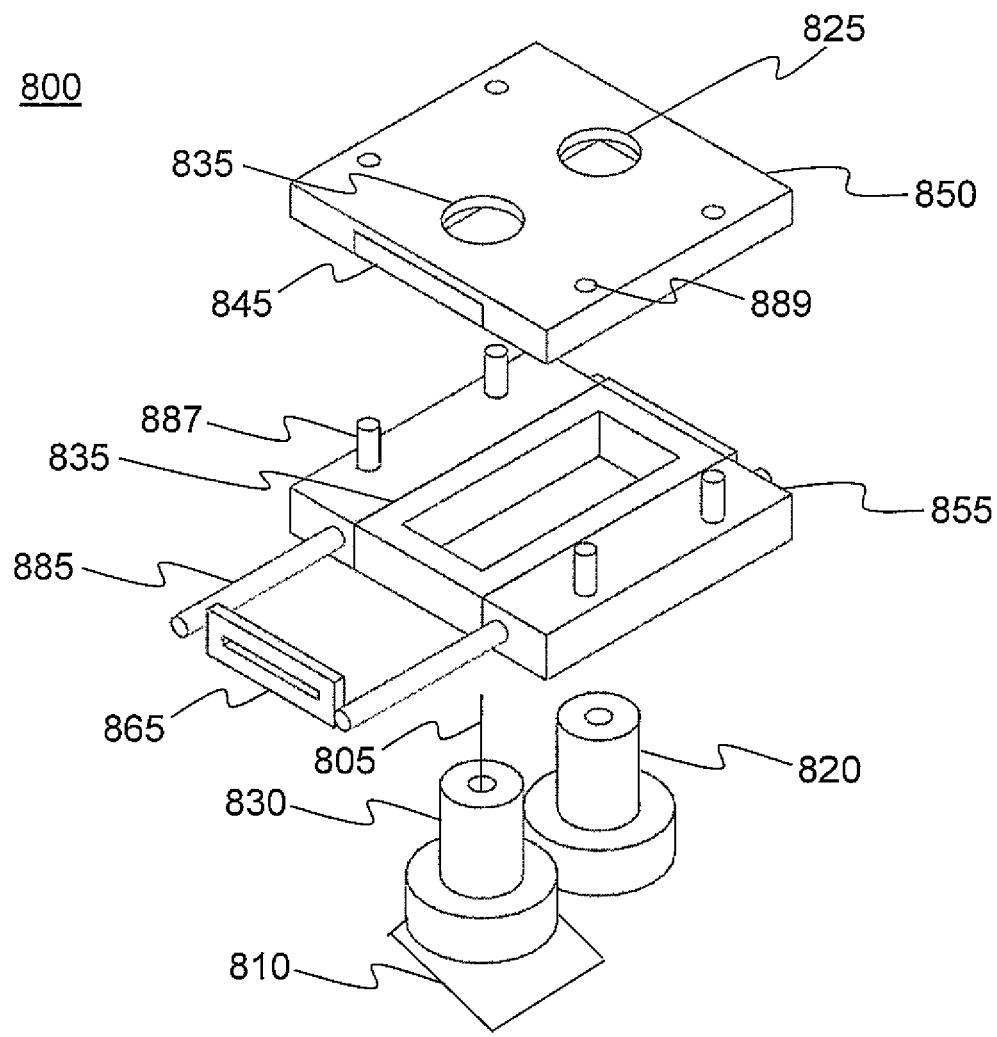
FIG. 8A is a perspective view of components that comprise a compact imaging module, according to an embodiment.

FIG. 8A is a perspective view of components that comprise a compact imaging module 800, according to an embodiment. Compact imaging module 800 may be similar to compact imaging module 700, for example. Compact imaging module 800 may comprise a horizontal motion (HM) platform 855 comprising a magnet 835, and a vertical motion (VM) platform 850 comprising a focusing coil 845 to magnetically interact with magnet 835. A first lens assembly 830 having a first effective focal length and a second lens assembly 820 having a second effective focal length may be mounted to and physically supported by VM platform 850. One or more zoom coils 865 attached to a portion of a frame (e.g., such as frame 640) of compact imaging module 800 may magnetically interact with the magnet 835 included in HM platform 855 to move the HM platform along shafts 885. Image sensor 810 may receive light from first lens assembly 830 if HM platform 855 is in a first position or the image sensor may receive light from second lens assembly 820 if HM platform 855 is in a second position. One or more zoom coils 865 may be used to select the first position or the second position, for example. In other words, one or more zoom coils 865 may magnetically interact with magnet 835 to place the HM platform in a first position or a second position. The one or more zoom coils 865 may be stationary with respect to image sensor 810 of compact imaging module 800. On the other hand, a focusing coil 845 attached to VM platform 850 may move relative to image sensor 810 and therefore be stationary with respect to first and second lens assemblies 820 and 830, as described below. In addition, a magnet attached to HM platform 855 may be moveable with respect to first and second lens assemblies 820 and 830 and image sensor 810. In one implementation, magnet 835 may be selectively magnetically coupled to focusing coil 845 and/or one or more zoom coils 865 to change a position of VM platform 850 in a direction parallel or perpendicular to optical axis 805.

Figure 8B:
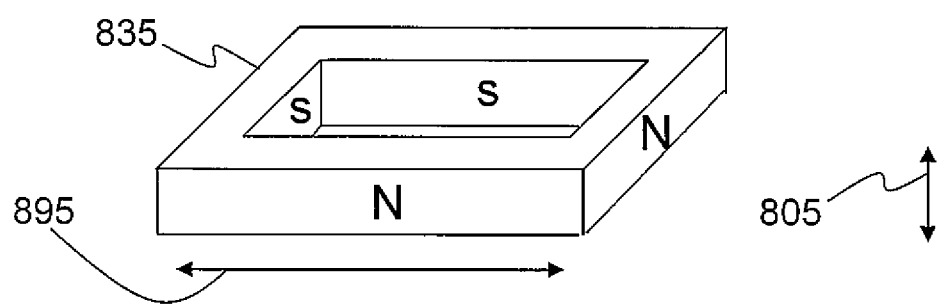
FIG. 8B is a perspective view of a ring-shaped magnet shared among multiple actuators for motion in two perpendicular directions, according to an embodiment.

Magnet 835 may be shared among zoom coils 865 and focusing coil 845. For example, magnet 835 may comprise exactly one magnet comprising magnetic poles arranged to interact with zoom coils 865 to impart horizontal motion to lens assemblies 820, 830 and to interact with focusing coils 865 to impart vertical motion to the lens assemblies. FIG. 8B shows an embodiment of magnet 835. In one implementation, magnet 835 may comprise a ring-shaped magnet, which may comprise a single monolithic permanent magnet or two or more separate portions of magnets, and claimed subject matter is not limited in this respect. Magnet 835 may comprise north magnetic poles on all sides of an outside perimeter and south magnetic poles on all sides of an inside perimeter, or vise versa. Magnet 835 may comprise north-south magnetic poles aligned in a direction 895 perpendicular to optical axis 805, for example. Such an arrangement of magnetic poles may allow for magnetic interaction among zoom coils 865 and focusing coil 845 as follows. For horizontal motion of lens assemblies 820, 830, electrical current may be provided to zoom coils 865 to activate the coils to impart an electromagnetic force on magnet 835. Accordingly, the electromagnetic force may move HM platform 855 in a horizontal direction along one or more rails or shafts 885 on which HM platform 855 moves. Shafts 885 may be oriented in a direction perpendicular to optical axis 805. Accordingly, platform HM 855 may move linearly in a direction perpendicular to optical axis 805 on shafts 885 to place lens assembly 820 or lens assembly 830 over an active region of image sensor 810. Horizontal motion of platform HM 855 may be performed to adjust a zoom level of compact imaging module 800, for example.

For vertical motion of lens assemblies 820, 830, electrical current may be provided to focusing coil 845 to activate the coil to impart an electromagnetic force on magnet 835. Accordingly, the electromagnetic force may move VM platform 850 in a vertical direction along one or more rails or shafts 887 on which platform 850 moves. Shafts 887 may be oriented in a direction parallel to optical axis 805. Accordingly, VM platform 855 may move linearly in a direction parallel to optical axis 805 on shafts 887 to guide VM platform 850 while changing a distance between lens assembly 820, 830 and image sensor 810. Vertical motion of platform 850 may be performed to adjust focus of compact imaging module 800, for example. Though compact imaging module 800 has been described to include two lens assemblies, additional lens assemblies may also be included, and claimed subject matter is not limited in this respect. Of course, such details of compact imaging module 800 are merely examples, and claimed subject matter is not so limited.

Figure 9:
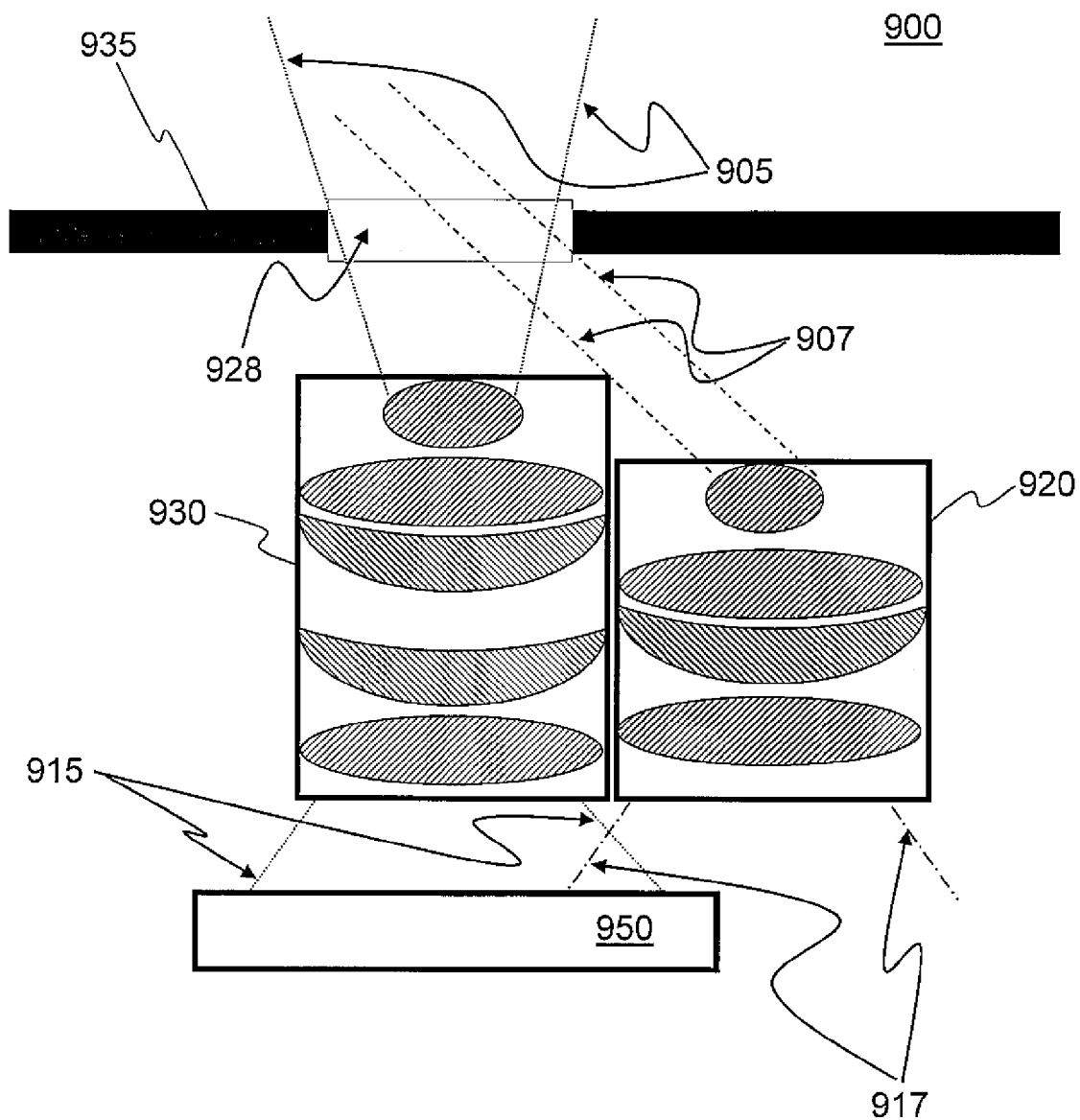
FIG. 9 is a schematic cross-section view showing light leakage in a module including lens assemblies and an image sensor, according to an embodiment.

FIG. 9 is a schematic cross-section view showing undesirable light leakage in a module 900 including lens assemblies and an image sensor, according to an embodiment. A top cover 935 comprising a portion of module 900 may include an aperture or opening 928 through which light may be received by a lens assembly 930 or another lens assembly 920. A light path 905 may describe a possible light path of light received by lens assembly 930. A light path 907 may describe a possible light path of light received by lens assembly 920. In the embodiment 900, lens assembly 930 comprises a selected lens assembly whereas lens assembly 920 comprises an unselected lens assembly. As discussed above, a selected lens assembly may be positioned over an image sensor 950, whereas an unselected lens assembly may be placed in a position away from the image sensor. A light path 915 may describe a possible light path of an image produced by selected lens assembly 930. A light path 917 may describe a possible light path of an image or stray light exiting from unselected lens assembly 920. Light exiting from unselected lens assembly 920 may undesirably fall onto an active region of image sensor 950, thus leading to light contamination. Compact imaging module configurations described below may reduce or eliminate such undesirable light contamination.

Figure 10:
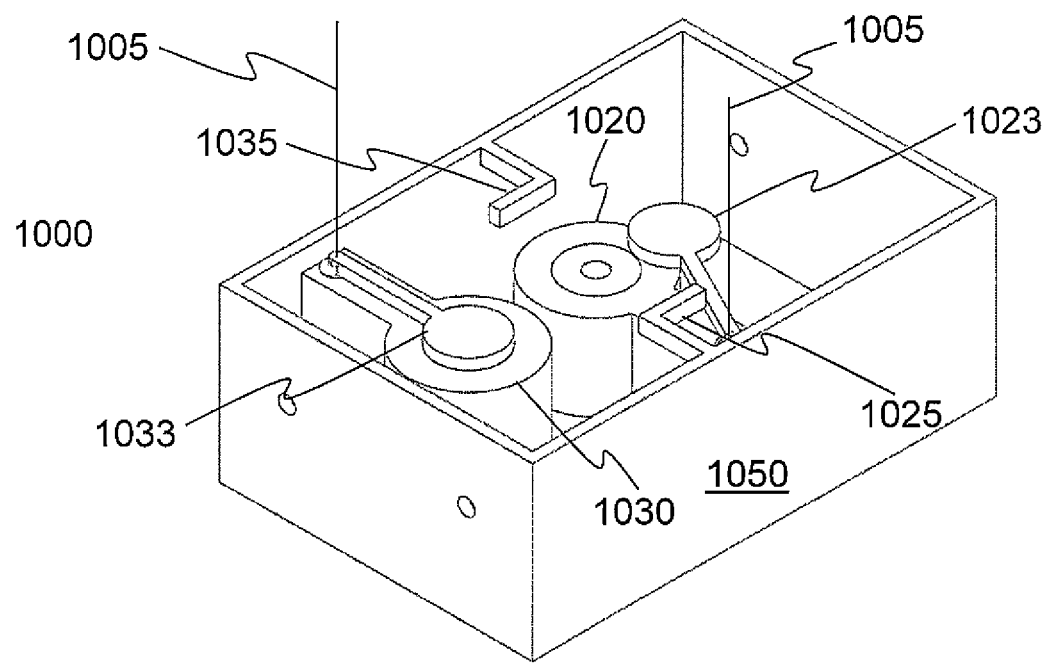
FIGS. 10 and 11 are perspective views of a portion of a compact imaging module, according to another embodiment.
Figure 11:
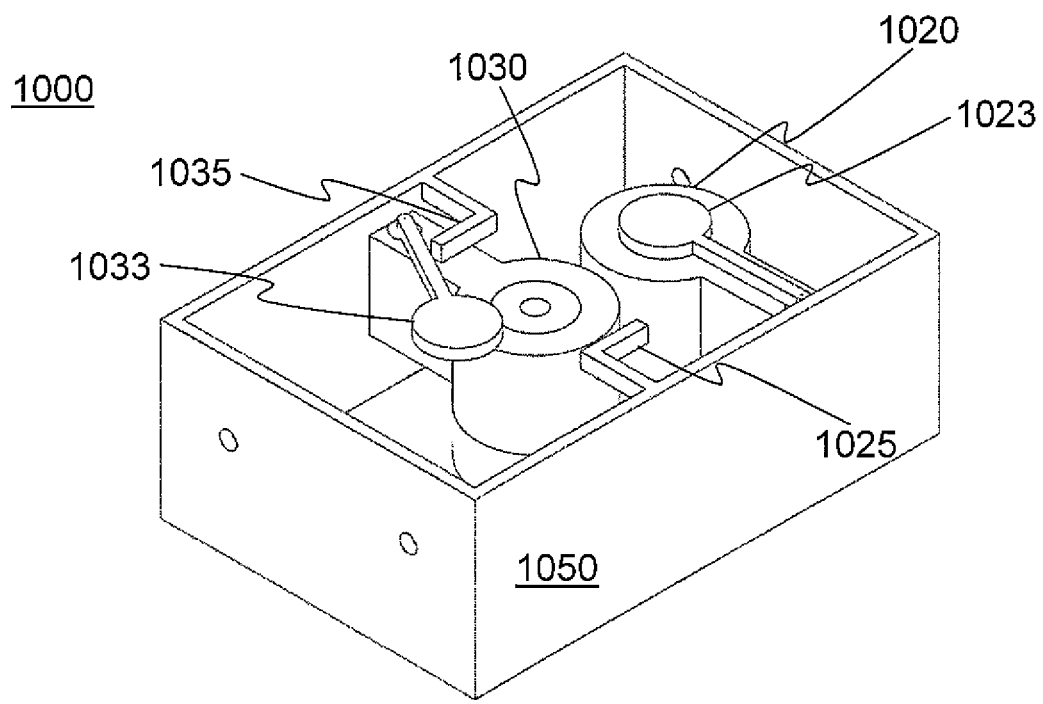

FIGS. 10 and 11 are perspective views of a portion of a compact imaging module 1000, according to an embodiment. Compact imaging module 1000 may include a light shield 1023 to cover at least a portion of a first lens assembly 1020 and a light shield 1033 to cover at least a portion of a second lens assembly 1030. Such light shields may be used to prevent light leakage from reaching an image sensor via an unselected lens assembly. For example, if first lens assembly 1020 is selected to be placed in front of an image sensor, then light shield 1033 may be used to cover at least a portion of unselected second lens assembly 1030 so that light leakage may be prevented from reaching the image sensor via the second lens assembly. In one implementation, a light shield may comprise one light shield per lens assembly. A light shield may physically interact with an appendage 1025 and 1035 or portion of a frame of compact imaging module 1000. Light shields 1023 and 1033 may comprise rotational freedom of motion about an axis 1005 that is moveable (e.g., with respect to an image sensor of compact imaging module 1000) with a moveable platform on which two or more individual lens assemblies 1020 and 1030 are placed. For example, as shown in FIG. 10, light shield 1023 may be rotated in response to striking appendage 1025. In such a case, light shield 1023 may be rotated into a position to allow light to enter selected lens assembly 1020. On the other hand, light shield 1033 may be rotated in response to striking appendage 1035. In such a case, light shield 1033 may be rotated into a position to cover at least a portion of unselected lens assembly 1030, thus preventing light leakage from reaching an image sensor via the unselected lens assembly. For another example, as shown in FIG. 11, light shield 1033 may be rotated in response to striking appendage 1035. In such a case, light shield 1033 may be rotated into a position to allow light to enter selected lens assembly 1030. On the other hand, light shield 1023 may be rotated in response to striking appendage 1025. In such a case, light shield 1023 may be rotated into a position to cover at least a portion of unselected lens assembly 1020, thus preventing light leakage from reaching an image sensor via the unselected lens assembly. In an implementation, light shields 1023 and 1033 may comprise a spring to maintain a position of the light shields to cover at least a portion of unselected first or second lens assemblies. Of course, such details of a light shield are merely examples, and claimed subject matter is not so limited.

Figure 12:
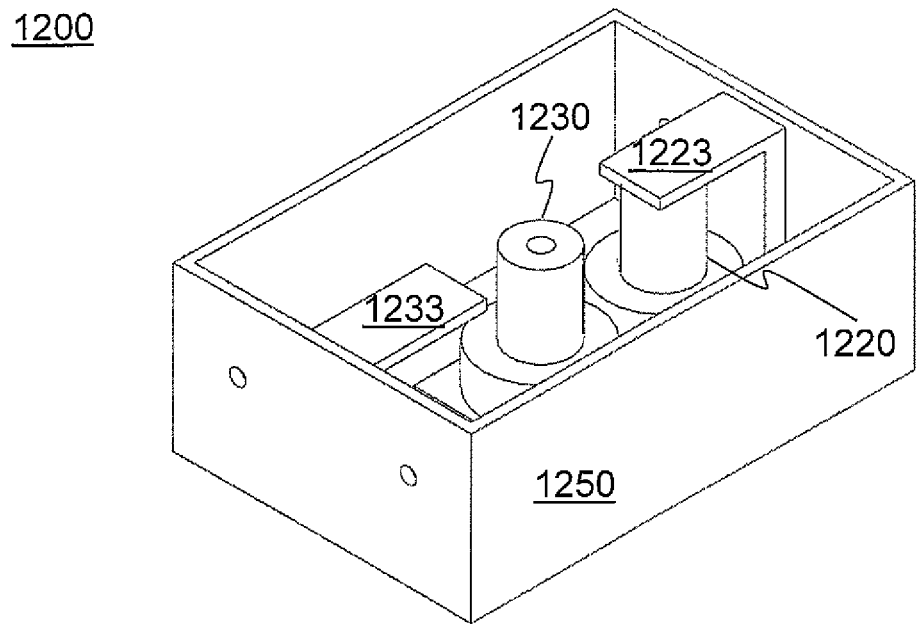
FIGS. 12 and 13 are perspective views of a portion of a compact imaging module, according to yet another embodiment.
Figure 13:
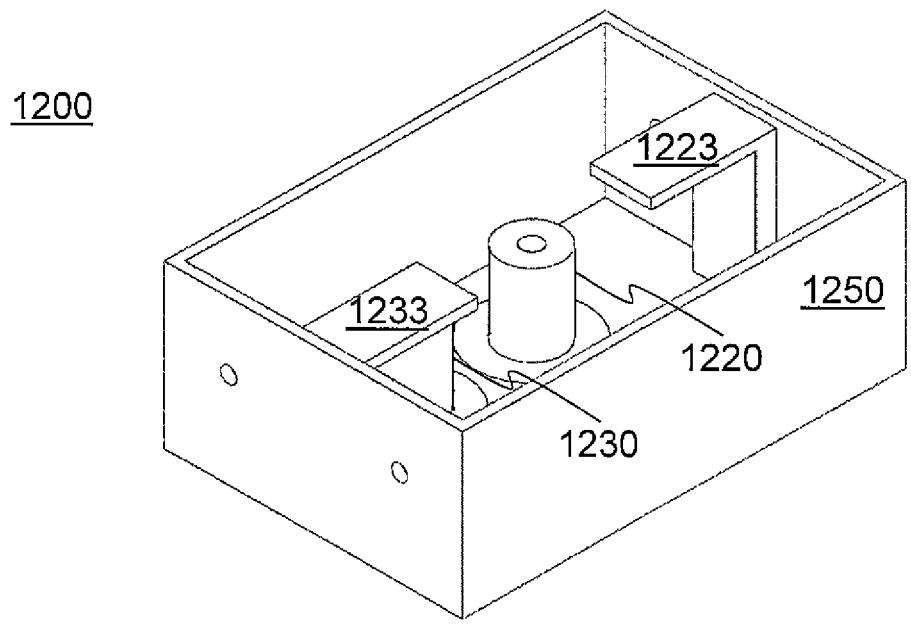

FIGS. 12 and 13 are perspective views of a portion of a compact imaging module 1200, according to yet another embodiment. Compact imaging module 1200 may include light shields 1223 and 1233 to cover at least a portion of first lens assembly 1220 or second lens assembly 1230, respectively. Such light shields may be used to prevent light leakage from reaching an image sensor via an unselected lens assembly. For example, as shown in FIG. 12, if second lens assembly 1230 is selected to be placed in front of an image sensor, then light shield 1223 may be used to cover at least a portion of unselected first lens assembly 1220 so that light leakage may be prevented from reaching the image sensor via the second lens assembly. In another example, as shown in FIG. 13, if first lens assembly 1220 is selected to be placed in front of an image sensor, then light shield 1233 may be used to cover at least a portion of unselected second lens assembly 1230 so that light leakage may be prevented from reaching the image sensor via the second lens assembly. A light shield may comprise an appendage or portion of a frame of a compact imaging module so that the light shield is stationary with respect to an image sensor of the compact imaging module. Of course, such details of a light shield are merely examples, and claimed subject matter is not so limited.

Figure 14:
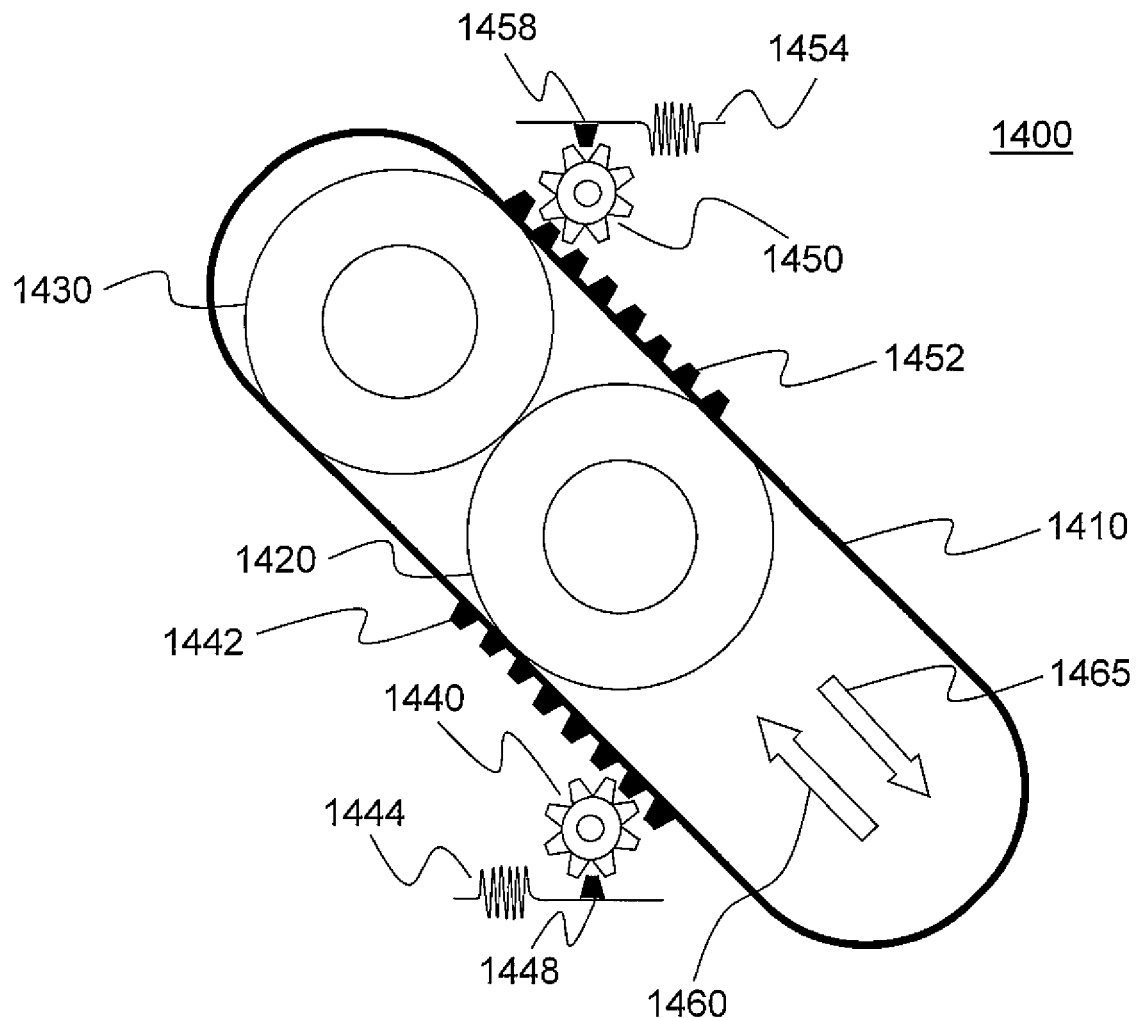
FIG. 14 is a schematic top view showing a compact imaging module including a shaped memory alloy actuator, according to an embodiment.

FIG. 14 is a schematic top view showing a compact imaging module 1400 including a shaped memory alloy actuator, according to an embodiment. A first lens assembly 1430 having a first effective focal length and a second lens assembly 1420 having a second effective focal length may be mechanically connected to an actuator comprising a shaped memory alloy (SMA). A SMA may comprise a material, such as a metallic wire, for example, that may contract in response to an applied electric current.

In further detail of an embodiment, a SMA may comprise an alloy that "remembers" its original, cold-forged shape: returning to a pre-deformed shape by heating. Examples of SMA materials include copper-zinc-aluminum-nickel, copper-aluminum-nickel, nickel-titanium (NiTi) alloys, and zinc, copper, gold and iron alloys, just to name a few examples. For example, an electric current applied to SMA wire 1454 may lead to contraction (e.g., shortening) of SMA wire 1454. Accordingly, the contracting SMA wire may impart a force on hook 1458 to move in a direction that rotates gear 1450 clockwise. In turn, rotation of gear 1450 may engage teeth 1452 to move conveyor portion 1410 to move first and second lens assemblies 1430 and 1420 in a direction 1460. An image sensor (not shown in FIG. 14) may be positioned to receive light from first lens assembly 1430 if the first lens assembly is in a first position or to receive light from second lens assembly 1420 if the second lens assembly is in a second position. In one implementation, first and second lens assemblies 1430 and 1420 may be mounted on a moveable platform. Thus, an image sensor may be positioned to receive light from first lens assembly 1430 if the moveable platform is in a first position or to receive light from second lens assembly 1420 if the moveable platform is in a second position.

In one implementation, an electric current applied to SMA wire 1444 may lead to contraction (e.g., shortening) of SMA wire 1444. Accordingly, the contracting SMA wire may impart a force on hook 1448 to move in a direction that rotates gear 1440 clockwise. In turn, rotation of gear 1440 may engage teeth 1442 to move conveyor portion 1410 to move first and second lens assemblies 1430 and 1420 in a direction 1465. Thus, energizing SMA wire 1444 may reverse direction of motion from that imparted by energizing SMA wire 1454, for example. Of course, such details of compact imaging module 1400 are merely examples, and claimed subject matter is not so limited.

One skilled in the art will realize that a virtually unlimited number of variations to the above descriptions is possible, and that the examples and the accompanying figures are merely to illustrate one or more particular implementations.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
   a first lens assembly having a first effective focal length and a second lens assembly having a second effective focal length;
   a moveable platform on which said first and said second lens assemblies are mounted;
   an image sensor positioned to receive light from said first lens assembly if said moveable platform is in a first position or to receive light from said second lens assembly if said moveable platform is in a second position; and
   a coupling structure comprising:
     a first actuator to move said moveable platform linearly in a first direction to adjust a focus of said first lens assembly or said second lens assembly with respect to said image sensor in response to a change in distance between said image sensor and said moveable platform; and
     a second actuator to move said moveable platform linearly in a second direction perpendicular to said first direction to said first position or said second position.

2. The apparatus of claim 1, wherein said first actuator comprises at least one magnet and at least one coil to produce an electromagnetic force on said moveable platform in said first direction, and wherein said second actuator comprises at least one magnet and at least one coil to produce an electromagnetic force on said moveable platform in said second direction.

3. The apparatus of claim 1, wherein said first direction comprises a direction parallel to an optical axis of said first or said second lens assemblies, and wherein said second direction comprises a direction perpendicular to said optical axis.

4. The apparatus of claim 1, further comprising at least one additional lens assembly mounted on said moveable platform.

5. The apparatus of claim 1, wherein said second actuator comprises a discrete-position type actuator.

6. The apparatus of claim 1, further comprising a light shield to cover at least a portion of one of said first lens assembly and said second lens assembly which is not providing light to said image sensor.

7. The apparatus of claim 6, wherein said light shield comprises two light shields that are stationary with respect to said image sensor.

8. The apparatus of claim 7, wherein said light shield is moveable in response to striking a portion of a frame that is stationary with respect to said image sensor.

9. The apparatus of claim 7, wherein said light shield comprises a spring to maintain a position of said light shield to cover at least a portion of one of said first lens assembly and second lens assembly which is not providing light to said image sensor.

10. The apparatus of claim 1, wherein said first actuator or said second actuator comprises shaped memory alloy to drive said moveable platform.

11. An apparatus comprising:
a horizontal motion (HM) platform comprising a magnet;
a vertical motion (VM) platform comprising a focusing coil to magnetically interact with said magnet;
a first lens assembly having a first effective focal length and a second lens assembly having a second effective focal length, wherein said first and said second lens assemblies are physically supported by said VM platform;
one or more zoom coils to magnetically interact with said magnet; and
an image sensor positioned to receive light from said first lens assembly if said HM platform is in a first position or to receive light from said second lens assembly if said HM platform is in a second position, wherein said HM platform is configured to move linearly.

12. The apparatus of claim 11, wherein said one or more zoom coils magnetically interact with said magnet to place said HM platform in said first position or said second position.

13. An apparatus comprising:
a horizontal motion (HM) platform comprising a magnet;
a vertical motion (VM) platform comprising a focusing coil to magnetically interact with said magnet;
a first lens assembly having a first effective focal length and a second lens assembly having a second effective focal length, wherein said first and said second lens assemblies are physically supported by said VM platform;
one or more zoom coils to magnetically interact with said magnet; and
an image sensor positioned to receive light from said first lens assembly if said HM platform is in a first position or to receive light from said second lens assembly if said HM platform is in a second position, wherein said one or more zoom coils are stationary with respect to said image sensor.

14. The apparatus of claim 11, wherein said focusing coil is stationary with respect to said first and said second lens assemblies and moveable with respect to said image sensor.

15. The apparatus of claim 11, wherein said magnet is moveable with respect to said first and said second lens assemblies.

16. The apparatus of claim 11, wherein said magnet is selectively magnetically coupled to said focusing coil and/or said one or more zoom coils to change a position of said VM platform in a direction parallel to an optical axis of said first or said second lens assemblies or a direction perpendicular to said optical axis.

17. An apparatus comprising:
a horizontal motion (HM) platform comprising a magnet;
a vertical motion (VM) platform comprising a focusing coil to magnetically interact with said magnet;
a first lens assembly having a first effective focal length and a second lens assembly having a second effective focal length, wherein said first and said second lens assemblies are physically supported by said VM platform;
one or more zoom coils to magnetically interact with said magnet; and
an image sensor positioned to receive light from said first lens assembly if said HM platform is in a first position or to receive light from said second lens assembly if said HM platform is in a second position, wherein said magnet comprises a ring-shaped magnet.

18. The apparatus of claim 11, further comprising at least one additional lens assembly physically supported by said VM platform.

19. The apparatus of claim 11, further comprising one or more shafts on which said HM platform moves.

20. The apparatus of claim 16, wherein said magnet comprises north-south magnetic poles aligned perpendicular to said optical axis.

21. The apparatus of claim 11, further comprising a light shield to cover at least a portion of one of said first lens assembly and second lens assembly which is not providing light to said image sensor.

22. The apparatus of claim 21, wherein said light shield comprises two light shields that are stationary with respect to said image sensor.

23. The apparatus of claim 21, wherein said light shield comprises rotational freedom of motion about an axis that is moveable with respect to said image sensor.

24. The apparatus of claim 23, wherein said light shield is rotatable in response to striking a portion of a frame that is stationary with respect to said image sensor.

25. The apparatus of claim 23, wherein said light shield comprises a spring to maintain a position of said light shield to cover at least a portion of one of said first lens assembly and second lens assembly which is not providing light to said image sensor.

26. The apparatus of claim 1, wherein movement of said first or second lens assembly imparts an auto-focus function.

27. The apparatus of claim 1, wherein movement of said first or second lens assembly in said second direction imparts a zoom function.

* * * * *

(12) EX PARTE REEXAMINATION CERTIFICATE (35th)
Ex Parte Reexamination Ordered under 35 U.S.C. 257

United States Patent
Yeung et al.

(10) Number: US 8,428,451 C1
(45) Certificate Issued: Sep. 3, 2015

(54) INTERCHANGEABLE ZOOM LENS ACTUATOR

(75) Inventors: Chuen Kuen Yeung, New Territories, HI (US); Kai Cheong Kwan, Wong Tai Sin (HK); Kwok Sing Cheng, Tuen Mun (HK)

(73) Assignee: HONG KONG APPLIED SCIENCE AND TECHNOLOGY RESEARCH INSTITUTE CO. LTD., Shatin, New Territories (HK)

Supplemental Examination Request:
No. 96/000,072, Nov. 21, 2014

Reexamination Certificate for:
Patent No.: 8,428,451
Issued: Apr. 23, 2013
Appl. No.: 13/190,258
Filed: Jul. 25, 2011

(51) Int. Cl.
*G03B 17/14* (2006.01)

(52) U.S. Cl.
CPC .................................. *G03B 17/14* (2013.01)

(58) Field of Classification Search
USPC .......................................................... 396/133
See application file for complete search history.

(56) References Cited

To view the complete listing of prior art documents cited during the supplemental examination proceeding and the resulting reexamination proceeding for Control Number 96/000,072, please refer to the USPTO's public Patent Application Information Retrieval (PAIR) system under the Display References tab.

*Primary Examiner* — Fred Ferris, III

(57) ABSTRACT

The subject matter disclosed herein relates to an optical module that includes interchangeable lenses to adjust a zoom level of the optical module.

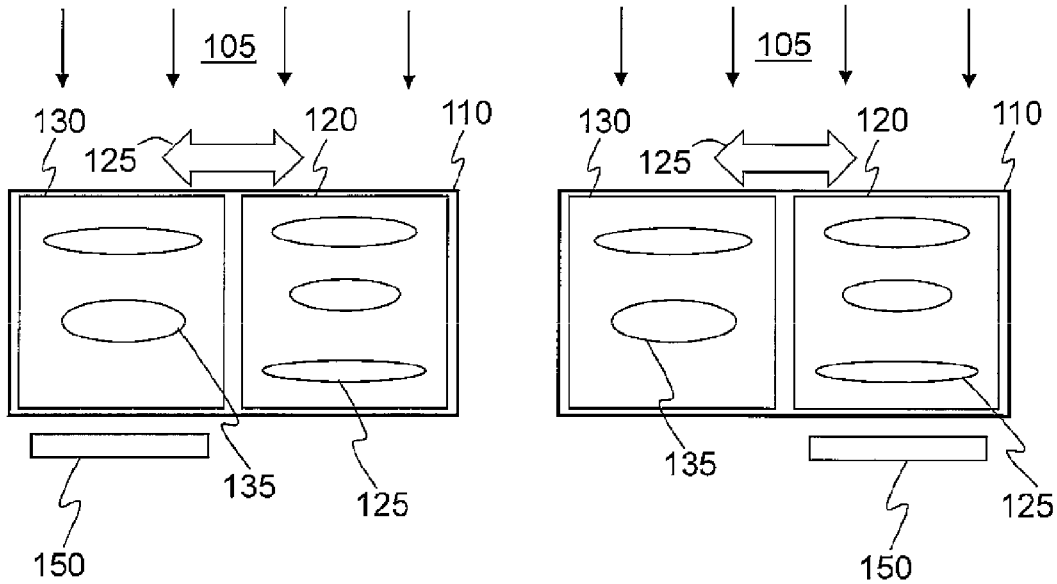

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 11, 13 and 17 are determined to be patentable as amended.

Claims 2-10, 12, 14-16 and 18-27, dependent on an amended claim, are determined to be patentable.

New claims 28-31 are added and determined to be patentable.

1. An apparatus comprising:
a first lens assembly having a first effective focal length and a second lens assembly having a second effective focal length;
a moveable platform on which said first and said second lens assemblies are mounted;
an image sensor positioned to receive light from said first lens assembly if said moveable platform is in a first position or to receive light from said second lens assembly if said moveable platform is in a second position; and
a coupling structure comprising: a first actuator to move said moveable platform linearly in a first direction to adjust a focus of said first lens assembly or said second lens assembly with respect to said image sensor [in response to a change in] *by changing a* distance between said image sensor and said moveable platform; and
a second actuator to move said moveable platform linearly in a second direction perpendicular to said first direction to said first position or said second position.

11. An apparatus comprising:
a horizontal motion (HM) platform comprising a magnet;
a vertical motion (VM) platform comprising a focusing coil [to], *wherein said focusing coil* magnetically [interact] *interacts* with said magnet *to move said VM platform in a direction parallel to an optical axis when said focusing coil is activated*;
a first lens assembly having a first effective focal length and a second lens assembly having a second effective focal length, wherein said first and said second lens assemblies are physically supported by said VM platform;
one or more zoom coils to magnetically interact with said magnet *to move said HM platform in a direction perpendicular to said optical axis when said one or more zoom coils are activated*; and
an image sensor positioned to receive light from said first lens assembly if said HM platform is in a first position or to receive light from said second lens assembly if said HM platform is in a second position, wherein said HM platform *is configured to move linearly*.

13. An apparatus comprising:
a horizontal motion (HM) platform comprising a magnet;
a vertical motion (VM) platform comprising a focusing coil [to], *wherein said focusing coil* magnetically [interact] *interacts* with said magnet *to move said VM platform in a direction parallel to an optical axis when said focusing coil is activated*;
a first lens assembly having a first effective focal length and a second lens assembly having a second effective focal length, wherein said first and said second lens assemblies are physically supported by said VM platform;
one or more zoom coils to magnetically interact with said magnet *to move said HM platform in a direction perpendicular to said optical axis when said one or more zoom coils are activated*; and
an image sensor positioned to receive light from said first lens assembly if said HM platform is in a first position or to receive light from said second lens assembly if said HM platform is in a second position, wherein said one or more zoom coils are stationary with respect to said image sensor.

17. An apparatus comprising:
a horizontal motion (HM) platform comprising a magnet;
a vertical motion (VM) platform comprising a focusing coil [to], *wherein said focusing coil* magnetically [interact] *interacts* with said magnet *to move said VM platform in a direction parallel to an optical axis when said focusing coil is activated*;
a first lens assembly having a first effective focal length and a second lens assembly having a second effective focal length, wherein said first and said second lens assemblies are physically supported by said VM platform;
one or more zoom coils to magnetically interact with said magnet *to move said HM platform in a direction perpendicular to said optical axis when said one or more zoom coils are activated*; and
an image sensor positioned to receive light from said first lens assembly if said HM platform is in a first position or to receive light from said second lens assembly if said HM platform is in a second position, wherein said magnet comprises a ring-shaped magnet.

*28. The apparatus of claim 1, wherein said first effective focal length is different from said second effective focal length.*

*29. The apparatus of claim 11, wherein said first effective focal length is different from said second effective focal length.*

*30. An apparatus comprising:*
*a first lens assembly having a first effective focal length and a second lens assembly having a second effective focal length;*
*a moveable platform on which said first and said second lens assemblies are mounted;*
*an image sensor positioned to receive light from said first lens assembly if said moveable platform is in a first position or to receive light from said second lens assembly if said moveable platform is in a second position; and*
*a coupling structure comprising: a first actuator to move said moveable platform linearly in a first direction to adjust a focus of said first lens assembly or said second lens assembly with respect to said image sensor by changing a distance between said image sensor and said moveable platform;*
*a second actuator to move said moveable platform linearly in a second direction perpendicular to said first direction to said first position or said second position; and*
*a light shield to cover at least a portion of one of said first lens assembly and said second lens assembly which is not providing light to said image sensor, wherein said light shield comprises rotational freedom of motion about an axis that is moveable with respect to said image sensor.*

31. An apparatus comprising:
a horizontal motion (HM) platform comprising a magnet;
a vertical motion (VM) platform comprising a focusing coil to magnetically interact with said magnet;
a first lens assembly having a first effective focal length and a second lens assembly having a second effective focal length, wherein said first and said second lens assemblies are physically supported by said VM platform;
one or more zoom coils to magnetically interact with said magnet;
an image sensor positioned to receive light from said first lens assembly if said HM platform is in a first position or to receive light from said second lens assembly if said HM platform is in a second position, wherein said HM platform is configured to move linearly; and
a light shield to cover at least a portion of one of said first lens assembly and said second lens assembly which is not providing light to said image sensor, wherein said light shield comprises a spring to maintain a position of said light shield to cover at least a portion of one of said first lens assembly and said second lens assembly which is not providing light to said image sensor.

\* \* \* \* \*